US010271249B2

(12) United States Patent
Bunte et al.

(10) Patent No.: US 10,271,249 B2
(45) Date of Patent: Apr. 23, 2019

(54) METHOD FOR OPERATING A NETWORK AND NETWORK PARTICIPANTS

(71) Applicant: Beckhoff Automation GmbH & Co. KG, Verl (DE)

(72) Inventors: Thorsten Bunte, Gütersloh (DE); Holger Büttner, Berlin (DE); Erik Vonnahme, Salzkotten (DE); Dirk Janssen, Verl (DE); Thomas Rettig, Rheda-Wiedenbrück (DE); Hans Beckhoff, Verl (DE)

(73) Assignee: BECKHOFF AUTOMATION GMBH, Verl (DE)

( * ) Notice: Subject to any disclaimer, the term of this patent is extended or adjusted under 35 U.S.C. 154(b) by 149 days.

(21) Appl. No.: 15/043,886

(22) Filed: Feb. 15, 2016

(65) Prior Publication Data
US 2016/0165498 A1 Jun. 9, 2016

Related U.S. Application Data

(63) Continuation of application No. PCT/EP2015/059369, filed on Apr. 29, 2015.

(30) Foreign Application Priority Data

Apr. 29, 2014 (DE) .................. 10 2014 106 017

(51) Int. Cl.
*H04L 5/14* (2006.01)
*H04L 29/08* (2006.01)
(Continued)

(52) U.S. Cl.
CPC ....... *H04W 36/0094* (2013.01); *H04L 5/1438* (2013.01); *H04L 45/22* (2013.01); *H04L 67/1044* (2013.01); *H04L 5/1446* (2013.01)

(58) Field of Classification Search
CPC ........ G06F 3/0484; G06F 13/14; G06F 17/00; H04L 2012/40215; H04L 1/0002; H04L 67/12
See application file for complete search history.

(56) References Cited

U.S. PATENT DOCUMENTS

2007/0005772 A1  1/2007  Mudigonda et al.
2007/0192505 A1  8/2007  Dalmia
(Continued)

FOREIGN PATENT DOCUMENTS

DE  102004061343 A1  6/2006
EP  2706707 A1  3/2014
WO  2009106931 A1  9/2009

Primary Examiner — Jung H Park
(74) Attorney, Agent, or Firm — Dorsey & Whitney LLP

(57) ABSTRACT

A network includes a first network participant connected via a first connection to a further network participant. The first network participant receives a data message containing information that a parameter must be set to a first value, via the first connection. The first network participant checks whether it is connected via a second connection to a still further network, and whether the parameter is not set to the first value in the second connection. In this case, the first network participant forwards the data message via the second connection, clearing down the second connection, and re-establishes the second connection, where the parameter for the second connection is set to the first value.

14 Claims, 15 Drawing Sheets

(51) Int. Cl.
*H04W 36/00* (2009.01)
*H04L 12/707* (2013.01)

(56) References Cited

U.S. PATENT DOCUMENTS

| | | |
|---|---|---|
| 2007/0291790 A1 | 12/2007 | Ue et al. |
| 2010/0329126 A1 | 12/2010 | Van Gassel et al. |
| 2012/0063389 A1 | 3/2012 | Abedi |
| 2012/0213078 A1* | 8/2012 | Kitada .................... H04L 47/17 370/236 |
| 2012/0243620 A1* | 9/2012 | Buehler .................. B23H 7/20 375/257 |

* cited by examiner

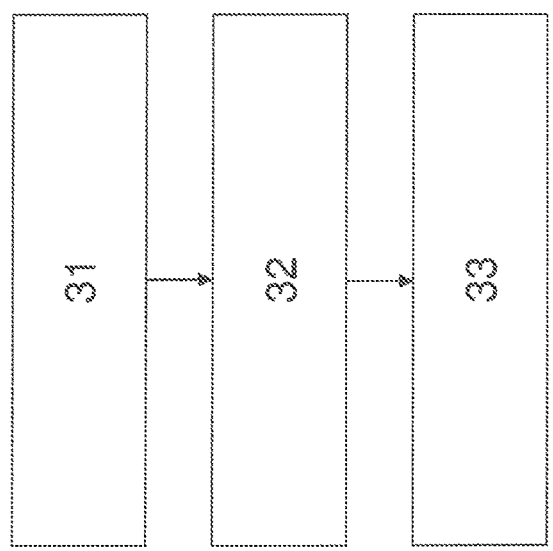
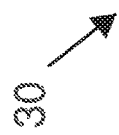
Fig. 13

METHOD FOR OPERATING A NETWORK AND NETWORK PARTICIPANTS

CROSS-REFERENCE TO RELATED APPLICATIONS

This application is a continuation of International Patent Application No. PCT/EP2015/059369, filed Apr. 29, 2015, entitled "METHOD FOR OPERATING A NETWORK AND NETWORK PARTICIPANTS," which claims priority to German Patent Application No. DE 10 2014 106 017.2, filed Apr. 29, 2014. The entirety of each of which is herein incorporated by reference.

BACKGROUND

Data networks are known from the prior art. It is known that data networks can be created in different topologies, for example in a ring topology or in an open ring topology (line topology).

Cable-connected data networks according to the prior art are frequently based on the Ethernet standard. Ethernet data networks can be operated in the prior art at different transmission rates, for example at transmission rates of 10 Mbit/s, 100 Mbit/s or 1 Gbit/s.

Under the generic term of "Industrial Ethernet," it is furthermore known in the prior art to use Ethernet data networks for the networking of devices in industrial manufacturing and automation technology. Data networks of this type may be based, for example, on the EtherCAT standard according to the IEC standard "IEC 61158."

Ethernet controllers which support a transmission rate of 1 Gbit/s can normally also be operated at 100 Mbit/s. If a network comprises some network participants which support transmission rates of 1 Gbit/s and 100 Mbit/s, and other network participants which support 100 Mbit/s only, the complete network should be operated at 100 Mbit/s.

The highest possible transmission rate can be set, for example automatically, between two adjacent network participants of a network. If two adjacent network participants both support 1 Gbit/s, a connection is established between these network participants on activation with a transmission rate of 1 Gbit/s. In order to change this connection to a transmission rate of 100 Mbit/s, the connection must be cleared down and then re-established with a transmission rate of 100 Mbit/s. This procedure takes a relatively long time of around 1 s.

If, in an example of a network with a line topology, a first network participant disposed at one end supports a transmission rate of 100 Mbit/s only, whereas all other network participants also support a transmission rate of 1 Gbit/s, the connections of the first network participant are initially established with a transmission rate of 100 Mbit/s, whereas the remaining connections of the network are established with a transmission rate of 1 Gbit/s.

A second network participant adjacent to the first network participant then recognizes that one of its connections is set to a transmission rate of 100 Mbit/s, whereas another of its connections is set to a transmission rate of 1 Gbit/s and must therefore be converted. To do this, the second network participant clears down this connection and re-establishes it with a transmission rate of 100 Mbit/s, which takes the aforementioned time of around 1 s. A third network participant adjacent to the second network participant then recognizes that one of its connections is now set to a transmission rate of 100 Mbit/s, whereas another of its connections is set to a transmission rate of 1 Gbit/s. This connection is in turn cleared down and re-established, which again takes the aforementioned time.

In this way, the speed adaptation propagates gradually through the network. The transmission rates are not converted simultaneously, but successively for each connection individually. A long time passes here until the network is ready for operation.

SUMMARY

Embodiments of the invention provide an improved method for operating a network and an improved network participant.

An embodiment of the invention is related to a method for operating a network in which a first network participant is connected via a first connection to a further network participant, the first network participant carries out steps of receiving a data message containing the information that a parameter must be set to a first value in connections, via the first connection, and of checking whether the first network participant is connected via a second connection to a still further network participant of the network and the parameter is not set to the first value in the second connection. In this case, the first network participant furthermore carries out steps of forwarding the data message via the second connection, of clearing down the second connection and of re-establishing the second connection, wherein the parameter for the second connection is set to the first value.

In an embodiment of the invention, a network participant is designed to carry out a method of the aforementioned type.

BRIEF DESCRIPTION OF THE DRAWINGS

For a clearer understanding of the present invention, a detailed description may be had in the following in conjunction with embodiments, some of which are illustrated in the accompanying drawings. It is to be noted, however, that the accompanying drawings only show typical embodiments of the present invention and are therefore not limiting of its scope since the invention may admit other equally effective embodiments.

FIG. 13 shows a schematic flow diagram of a third part of the method;

DETAILED DESCRIPTION

Figure 1:
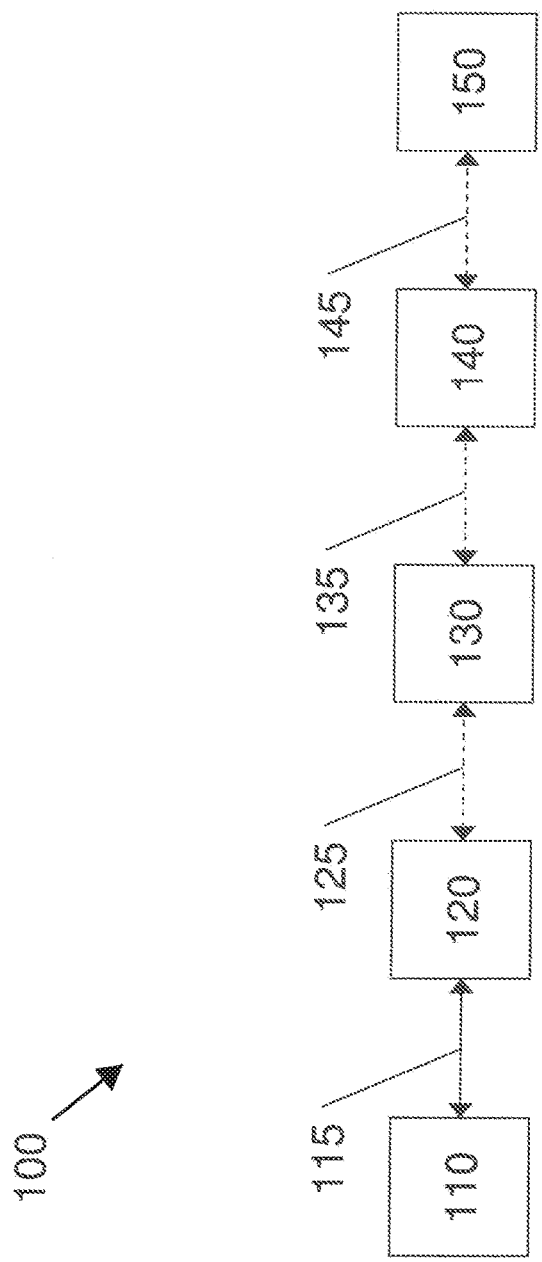
FIG. 1 shows a schematic representation of a first network at a first time.

FIG. 1 shows a schematic representation of a first network 100. The first network 100 is a data network which serves to transmit data between network participants of the first network 100. The first network 100 may be a wireless network or a cable-connected network. The first network 100 may, for example, be a network based on the Ethernet standard.

The first network 100 can serve to network devices in industrial manufacturing and/or for control or automation purposes. The first network 100 may, for example, be a network according to the EtherCAT standard.

In the example shown in FIG. 1, the first network 100 has a line topology. The line topology of the first network 100 may also be understood as an open ring topology. The individual network participants of the first network 100 are arranged behind one another via single-point connections and dual-point connections.

The example of a first network 100 shown in FIG. 1 comprises a first network participant 110, a second network participant 120, a third network participant 130, a fourth network participant 140 and a fifth network participant 150. The first network participant 110 is connected via a first connection 115 to the second network participant 120. The second network participant 120 is connected via a second connection 125 to the third network participant 130. The third network participant 130 is connected via a third connection 135 to the fourth network participant 140. The fourth network participant 140 is connected via a fourth connection 145 to the fifth network participant 150.

In each of the connections 115, 125, 135, 145 between the network participants 110, 120, 130, 140, 150 of the first network 100, one or more parameters can be set to values defined for the respective connection 115, 125, 135, 145. Parameters of this type may, for example, be a transmission rate, a message format, a minimum message length, a maximum message length, a minimum time interval between two transmitted data frames, a line code or an addressing mode.

Each of the network participants 110, 120, 130, 140, 150 may support one or more different values for each of the one or more parameters. For example, the network participants 110, 120, 130, 140, 150 may, depending on the type, support only one possible message format and only one possible transmission rate or a plurality of different message formats and a plurality of different transmission rates.

When setting up the connection 115, 125, 135, 145 existing between them, two adjacent network participants 110, 120, 130, 140, 150 of the first network 100 agree a value for each of the parameters to be set for the respective connection 115, 125, 135, 145 which is supported by both adjacent network participants 110, 120, 130, 140, 150. The value can be selected according to defined rules or in a random manner. This may result in different values being set for one or more parameters for different connections 115, 125, 135, 145 in the first network 100. However, it may be required that one or more of these parameters is set to a uniform value for all connections 115, 125, 135, 145 of the first network 100 for a fault-free operation of the first network 100.

In the first network 100 shown by way of example in FIG. 1, the second network participant 120, the third network participant 130, the fourth network participant 140 and the fifth network participant 150 in each case support a transmission rate of 100 Mbit/s and also a transmission rate of 1 Gbit/s. However, the first network participant 100 supports a transmission rate of 100 Mbit/s only. The second network participant 120 and the third network participant 130 have agreed a transmission rate of 1 Gbit/s for the second connection 125 existing between them. The third network participant 130, the fourth network participant 140 and the fifth network participant 150 have accordingly agreed a transmission rate of 1 Gbit/s for the third connection 135 and the fourth connection 145 existing between them. The first network participant 110 and the second network participant 120, on the other hand, have agreed a transmission rate of 100 Mbit/s for the first connection 115 existing between the first network participant 110 and the second network participant 120.

For a fault-free operation of the first network 100, it is necessary that all connections 115, 125, 135, 145 are set to the same transmission rate. Since the first network participant 110 supports a transmission rate of 100 Mbit/s only, the second connection 125, the third connection 135 and the fourth connection 145 must also be set to a transmission rate of 100 Mbit/s.

In order to change the values of the parameters of the connections 115, 125, 135, 145, for example to change the set transmission rate, it is necessary to clear down the respective connection 115, 125, 135, 145 and then re-establish it with the required value of the parameter. This procedure may be associated with a substantial time requirement. For example, the cleardown and re-establishment of a connection 115, 125, 135, 145 may require a time of around one second. Is therefore desirable to carry out this procedure essentially in parallel for all connections 125, 135, 145 of the first network 100 in which this is required. This is enabled by a method explained below.

Figure 2:
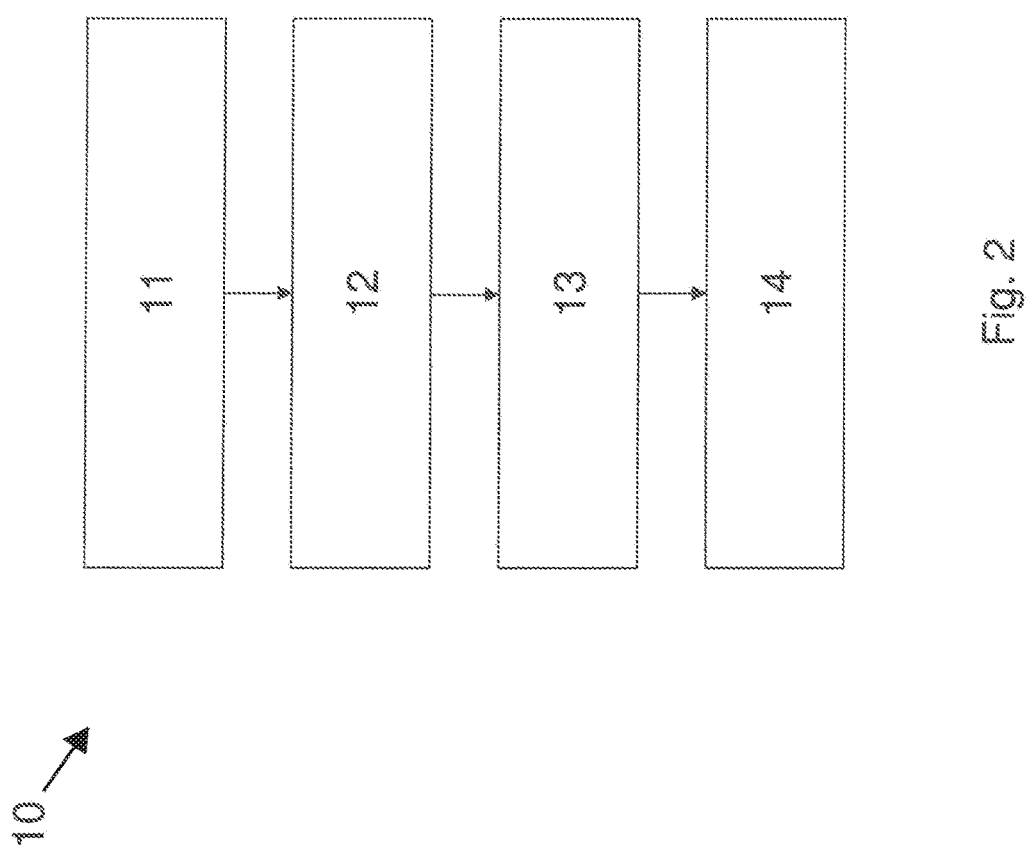
FIG. 2 shows a schematic flow diagram of a first part of a method.
Figure 3:
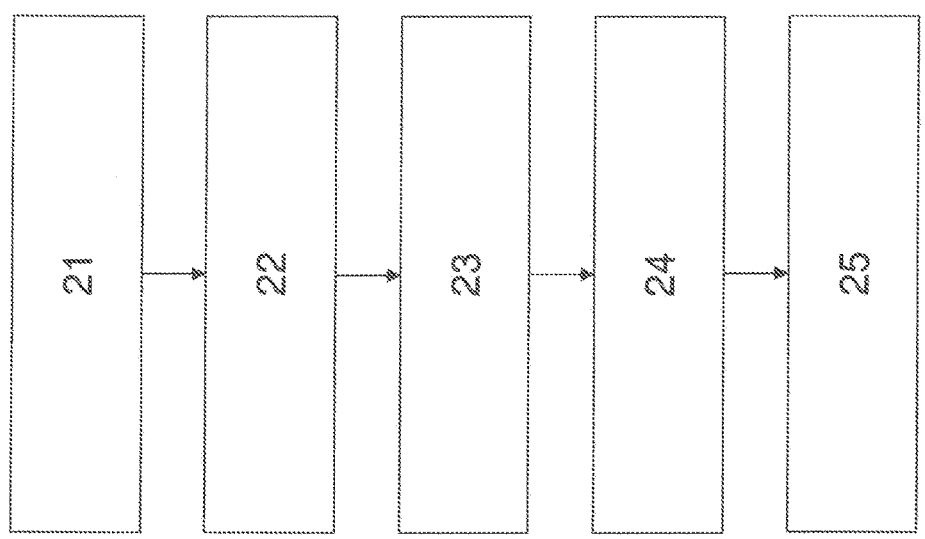
FIG. 3 shows a schematic flow diagram of a second part of the method.

FIG. 2 shows a schematic flow diagram of a first method part 10. The first method part 10 comprises method steps which are carried out by the second network participant 120 of the first network 100. FIG. 3 shows a schematic flow diagram of a second method part 20. The second method part 20 comprises method steps which are carried out by the third network participant 130, the fourth network participant 140 and the fifth network participant 150 of the first network 100.

In a first method step 11 of the first method 10, the second network participant 120 of the first network 100 recognizes that a parameter is set to a first value in the existing first connection 115 to the first network participant 110, whereas this parameter is set to a second value differing from the first value in the existing second connection 125 to the third network participant 130. In the specific example, the second network participant 120 recognizes in the first method step 11 of the first method part 10 that a transmission rate of 100 Mbit/s is set in the first connection 115, whereas a transmission rate of 1 Gbit/s is set in the second connection 125.

In a second method step 12 of the first method 10, the second network participant 120 transmits a data message containing the information that the parameter must be set to the first value in connections 115, 125, 135, 145 between network participants 110, 120, 130, 140, 150 in the first network 100. In the specific example, the second network participant 120 therefore transmits a data message in the second method step 12 of the first method part 10, containing the information that a transmission rate of 100 Mbit/s must be set in connections.

If the first network 100 is an Ethernet network, the data message transmitted by the second network participant 120 in the second method step 12 of the first method part 10 may be a special Ethernet message. If the first network 100 is an EtherCAT network, the data message transmitted by the second network participant 120 in the second method step 12 of the first method part 10 may be an EtherCAT message, i.e. an Ethernet message of a special Ether type.

The second network participant 120 transmits the second data message in the second method step 12 of the first method part 10 via all its connections in which the parameter is not set to the first value. In the specific example, the second network participant 120 therefore transmits the data message via all connections in which the transmission rate is not set to 100 Mbit/s, thus only via the second connection 125 and not via the first connection 115.

In a third method step 13 of the first method part 10 temporally following the second method step 12, the second network participant 120 of the first network 100 clears down all connections in which the parameter is not set to the first value, in the specific example therefore the second connection 125 in which the transmission rate is not set to 100 Mbit/s.

In a fourth method step 14 of the first method part 10, the second network participant 120 then re-establishes the connections cleared down in the third method step 13, wherein the parameter is set to the first value for the re-established connections. In the specific example, the second network participant 120 therefore re-establishes the second connection 125 to the third network participant 130 in the fourth method step 14 of the first method part 10, wherein a transmission rate of 100 Mbit/s is set.

The performance of the third method step 13 and the fourth method step 14 of the first method part 10 by the second network participant 120 can take a considerable amount of time, for example a time of around one second.

In a first method step 21 of the second method part 20, the third network participant 130 of the first network 100 receives the data message transmitted by the second network participant 120 in the second method step 12 of the first method part 10 via the second connection 125.

In a second method step 22 of the second method part 20, the third network participant 130 then checks whether it has further connections to further network participants in which the parameter is not set to the first value. In the specific example, the third network participant 130 checks in the second method step 22 of the second method part 20 whether, along with the second connection 125, it has further connections in which the transmission rate is not set to 100 Mbit/s. In the specific example, this is the case with the third connection 135.

After the check in the second method step 22 of the second method part 20 has revealed that the third network participant 130 has further connections to further network participants in which the parameter is not set to the first value, the third network participant 130, in a third method step 23 of the second method part 20, forwards the data message received in the first method step 21 of the second method part 20. The third network participant 130 forwards the data message via all its connections in which the parameter is not set to the first value, except for the connection via which it received the data message in the first method step 21. In the specific example, the third network participant 130 forwards the data message in the third method step 23 of the second method part 20 via the third connection 135, but not via the second connection 125.

In a fourth method step 24 of the second method part 20, the third network participant 130 clears down all connections in which the parameter is not set to the first value, except for the connection via which the data message was received in the first method step 21. In a fifth method step 25 of the second method part 20, the third network participant 130 then re-establishes all connections cleared down in the fourth method step 24, wherein the parameter is set to the first value. In the specific example, the third network participant 130 accordingly clears down the third connection 135 in the fourth method step 24 and re-establishes the third connection 135 in the fifth method step 25 of the second method part 20, wherein a transmission rate of 100 Mbit/s is set.

The performance of the fourth method step 24 and the fifth method step 25 of the second method part 20 by the third network participant 130 may take a considerable amount of time, for example a time of around one second. However, the fourth method step 24 and the fifth method step 25 of the second method part 20, i.e. the cleardown and re-establishment of the third connection 135, are carried out essentially in parallel with the performance of the third method step 13 and the fourth method step 14 of the first method part 10 by the second network participant 120, i.e. for the cleardown and re-establishment of the second connection 125. As a result, the time required for the cleardown and re-establishment of a connection essentially elapses once only.

The second method part 20 is also carried out by the fourth network participant 140 and the fifth network participant 150 of the first network 100. In the first method step 21 of the second method part 20, the fourth network participant 140 of the first network 100 receives, via the third connection 135, the data message transmitted by the third network participant 130. In the second method step 22 of the second method part 20, the fourth network participant 140 checks whether the transmission rate is set to a value other than 100 Mbit/s in further connections of the fourth network participant 140. This is the case with the fourth connection 145. In the third method step 23 of the second method part 20, the fourth network participant 140 forwards the previously received data message via the fourth connection 145. In the fourth method step 24 of the second method part 20, the fourth network participant 140 then clears down the fourth connection 145 in order to then re-establish it in the fifth method step 25 of the second method part 20, wherein a transmission rate of 100 Mbit/s is set.

The cleardown and re-establishment of the fourth connection 145 are carried out by the fourth network participant 140 essentially in parallel with the cleardown and re-establishment of the second connection 125 by the second network participant 120 and with the cleardown and re-establishment of the third connection 135 by the third network participant 130.

In the first method step 21 of the second method part 20, the fifth network participant 150 of the first network 100 receives the data message transmitted by the fourth network participant 140 via the fourth connection 145. In the second method step 22 of the second method part 20, the fifth network participant 150 checks whether it has further connections in which a transmission rate other than 100 Mbit/s is set. This is not the case. The fifth network participant 150 does not therefore then continue the performance of the second method part 20.

Figure 4:
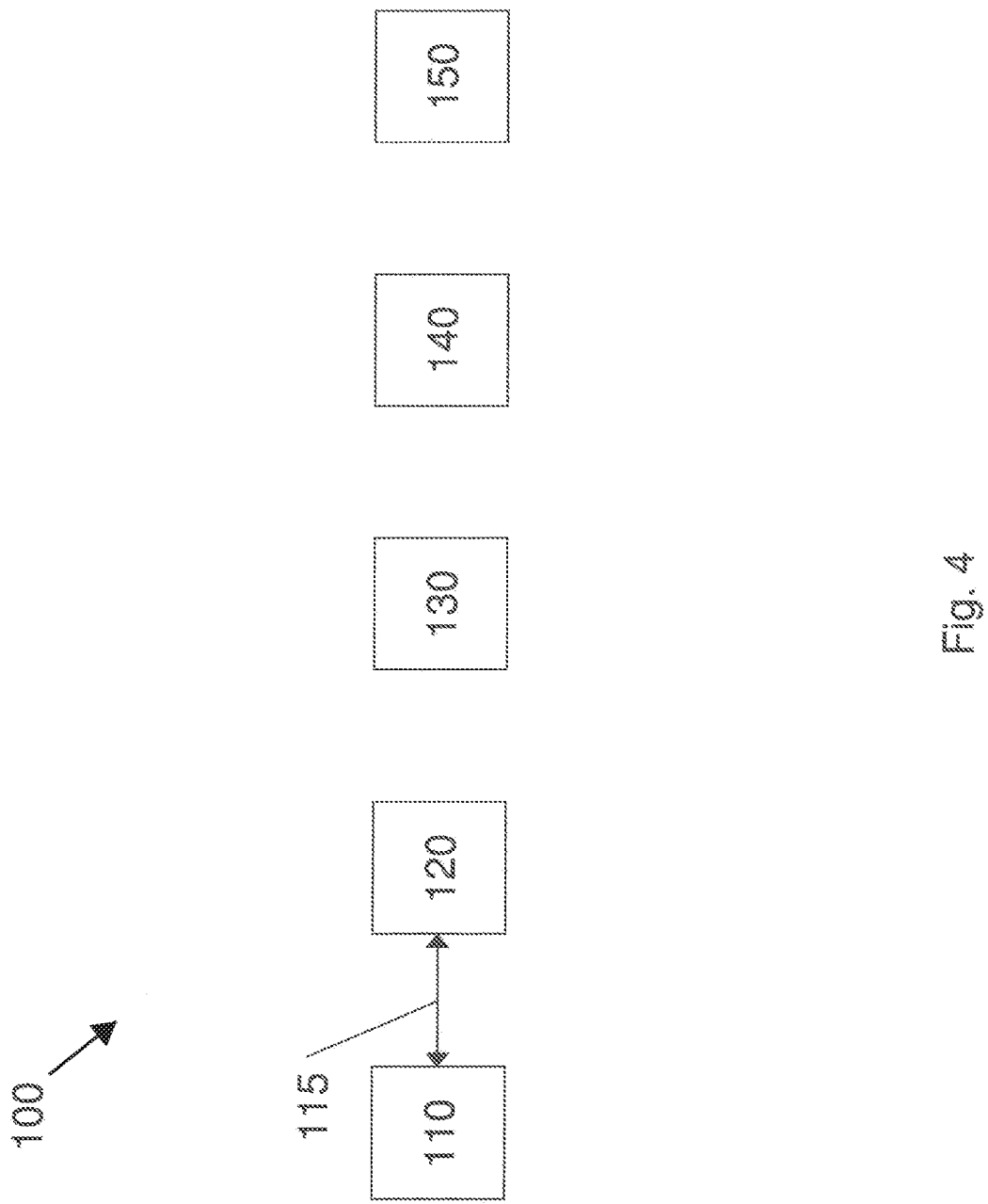
FIG. 4 shows a schematic representation of the first network at a second time.

FIG. 4 shows a schematic representation of the first network 100 following the cleardown of the second connection 125, the third connection 135 and the fourth connection 145 by the second network participant 120, the third network participant 130 and the fourth network participant 140 in the third method step 13 of the first method part 10 and the fourth method step 24 of the second method part 20. The connections 125, 135, 145 are cleared down essentially in parallel.

Figure 5:
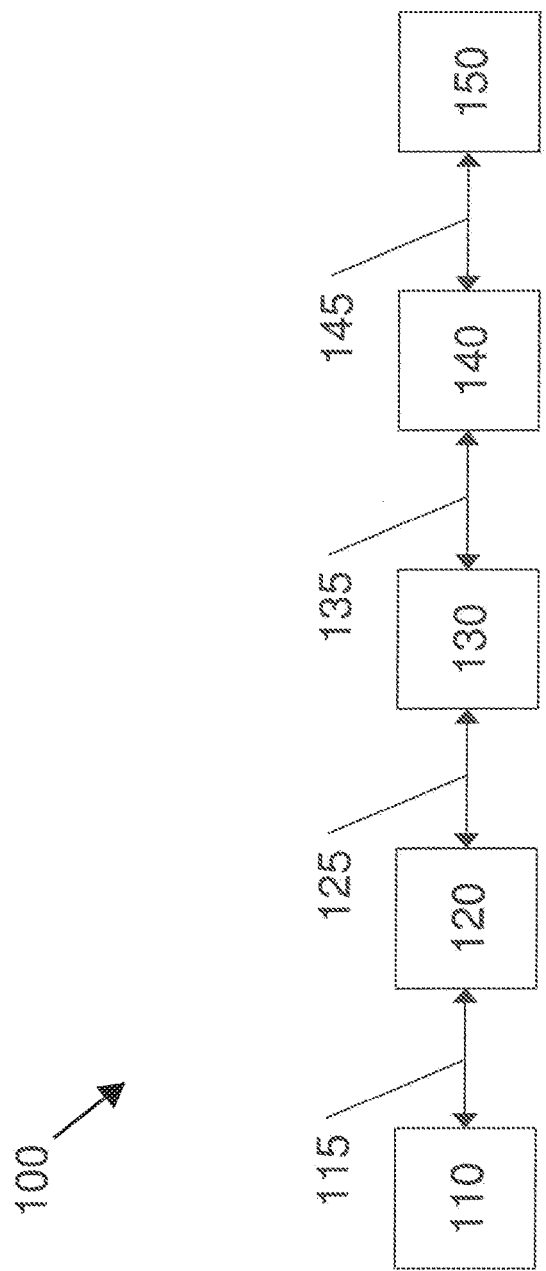
FIG. 5 shows a schematic representation of the first network at a third time.

FIG. 5 shows a schematic representation of the first network 100 following the re-establishment of the second connection 125, the third connection 135 and the fourth connection 145 by the second network participant 120, the third network participant 130 and the fourth network participant 140 in the fourth method step 14 of the first method part 10 and the fifth method step 25 of the second method part 20. The second connection 125, the third connection 135 and the fourth connection 145 have in each case been re-established with a set transmission rate of 100 Mbit/s. The second connection 125, the third connection 135 and the fourth connection 145 are re-established essentially in parallel.

Figure 6:
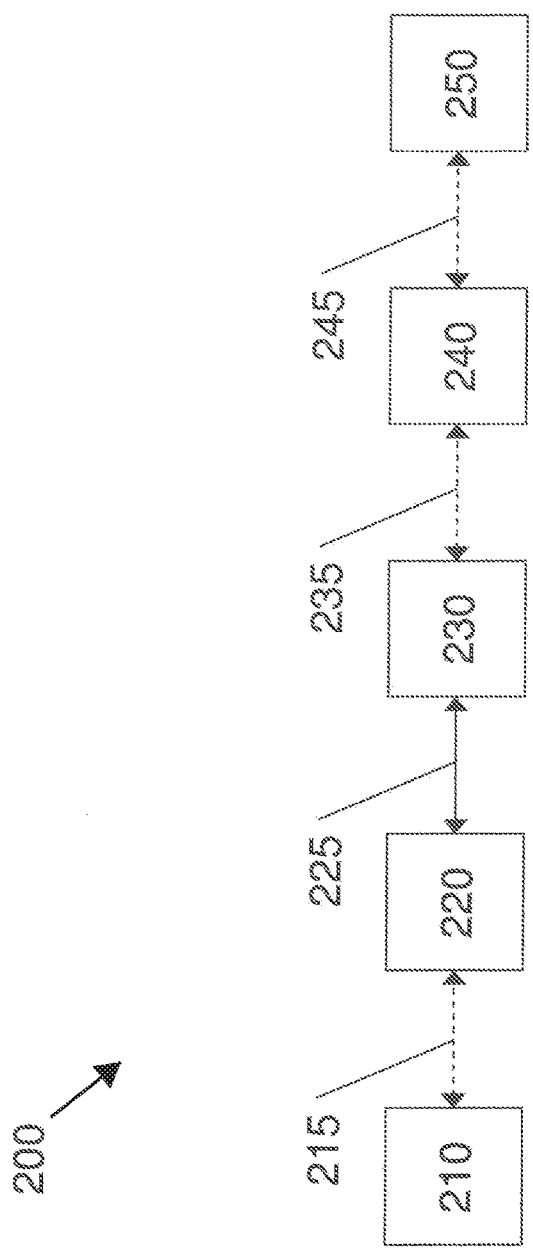
FIG. 6 shows a schematic representation of a second network at a first time.

FIG. 6 shows a schematic representation of a second network 200 with a first network participant 210, a second network participant 220, a third network participant 230, a fourth network participant 240 and a fifth network participant 250. The first network participant 210 is connected via a first connection 215 to the second network participant 220. The second network participant 220 is connected via a second connection 225 to the third network participant 230. The third network participant 230 is connected via a third connection 235 to the fourth network participant 240. The fourth network participant 240 is connected via a fourth connection 245 to the fifth network participant 250. The second network 220 may, for example, be based on the Ethernet standard, in particular, for example, on the EtherCAT standard also.

Different values can be set in each case for one or more parameters of the connections 215, 225, 235, 245 in the second network 200 also. In the example shown in FIG. 6, the transmission rates set for the individual connections 215, 225, 235, 245 again differ. However, the connections 215, 225, 235, 245 could alternatively or additionally also differ in the values of a different parameter. A transmission rate of 1 Gbit/s is set for the first connection 215, the third connection 235 and the fourth connection 245. A transmission rate of 100 Mbit/s is set for the second connection 225. The transmission rates were chosen randomly when the connections 215, 225, 235, 245 were established.

In the example shown, it is intended to be necessary to align the transmission rates selected for the individual connections 215, 225, 235, 245 with one another in such a way that a data rate of 100 Mbit/s is set for all connections 215, 225, 235, 245. The method with the first method part 10 and the second method part 20 explained with reference to FIGS. 2 and 3 is used for this purpose.

In the first method step 11 of the first method part 10, the second network participant 220 of the second network recognizes that a speed of 100 Mbit/s is set in the second connection 225, whereas a speed of 1 Gbit/s is set in the first connection 215. In the second method step 12 of the first method part 10, the second network participant 220 transmits a data message via the first connection 25, containing the information that the transmission rate must be set to 100 Mbit/s in connections. In the third method step 13 of the first method part 10, the second network participant 220 clears down the first connection 215 and then re-establishes it in the fourth method step 14 of the first method part 10, wherein the transmission rate is set to 100 Mbit/s.

The third network participant 230 of the second network 220 also carries out the first method part 10. In the first method step 11, the third network participant 230 of the second network 200 recognizes that a data rate of 100 Mbit/s is set for the second connection 225, whereas a data rate of 1 Gbit/s is set for the third connection 235. In the second method step 12 of the first method part 10, the third network participant 230 then transmits a data message via the third connection 235, containing the information that the transmission rate must be set to 100 Mbit/s in connections. In the third method step 13 of the first method part 10, the third network participant 230 then clears down the third connection 235 and re-establishes it in the fourth method step 14 of the first method part 10, wherein the transmission rate is set to 100 Mbit/s.

The first network participant 210 of the second network 200 carries out the second method part 20. In the first method step 21 of the second method part 20, the first network participant 210 receives, via the first connection 215, the data message transmitted by the second network participant 220. In the second method step 22 of the second method part 20, the first network participant 210 checks whether it has further connections to further network participants in which the transmission rate is not set to 100 Mbit/s. Since this is not the case, the first network participant 210 then ends the performance of the second method part 20.

The fourth network participant 240 of the second network 200 similarly carries out the second method part 20. In the first method step 21 of the second method part 20, the fourth network participant 240 receives the data message transmitted by the third network participant 230 via the third connection 235. In the second method step 22 of the second method part 20, the fourth network participant 240 then checks whether it has further connections to further network participants of the second network 200 in which the transmission rate is not set to 100 Mbit/s. This is the case with the fourth connection 245 to the fifth network participant 250. In the third method step 23 of the second method part 20, the fourth network participant 240 of the second network therefore forwards, via the fourth connection 245, the data message received in the first method step 21. In the fourth method step 24 of the second method part 20, the fourth network participant 240 then clears down the fourth connection 245 in order to re-establish it in the fifth method step 25 of the second method 20. The transmission rate is set here to 100 Mbit/s.

The fifth network participant 250 of the second network 200 similarly carries out the second method part 20. In the first method step 21, the fifth network participant 250 receives the data message transmitted by the fourth network participant 240 via the fourth connection 245. In the second method step 22 of the second method part 20, the fifth network participant 250 checks whether it has further connections to further network participants of the second network 200 in which the transmission rate is not set to 100 Mbit/s. This is not the case, since the fifth network participant 250 has no further connections apart from the fourth connection 245 to the fourth network participant 240. The fifth network participant 250 therefore ends the performance of the second method part 20.

Figure 7:
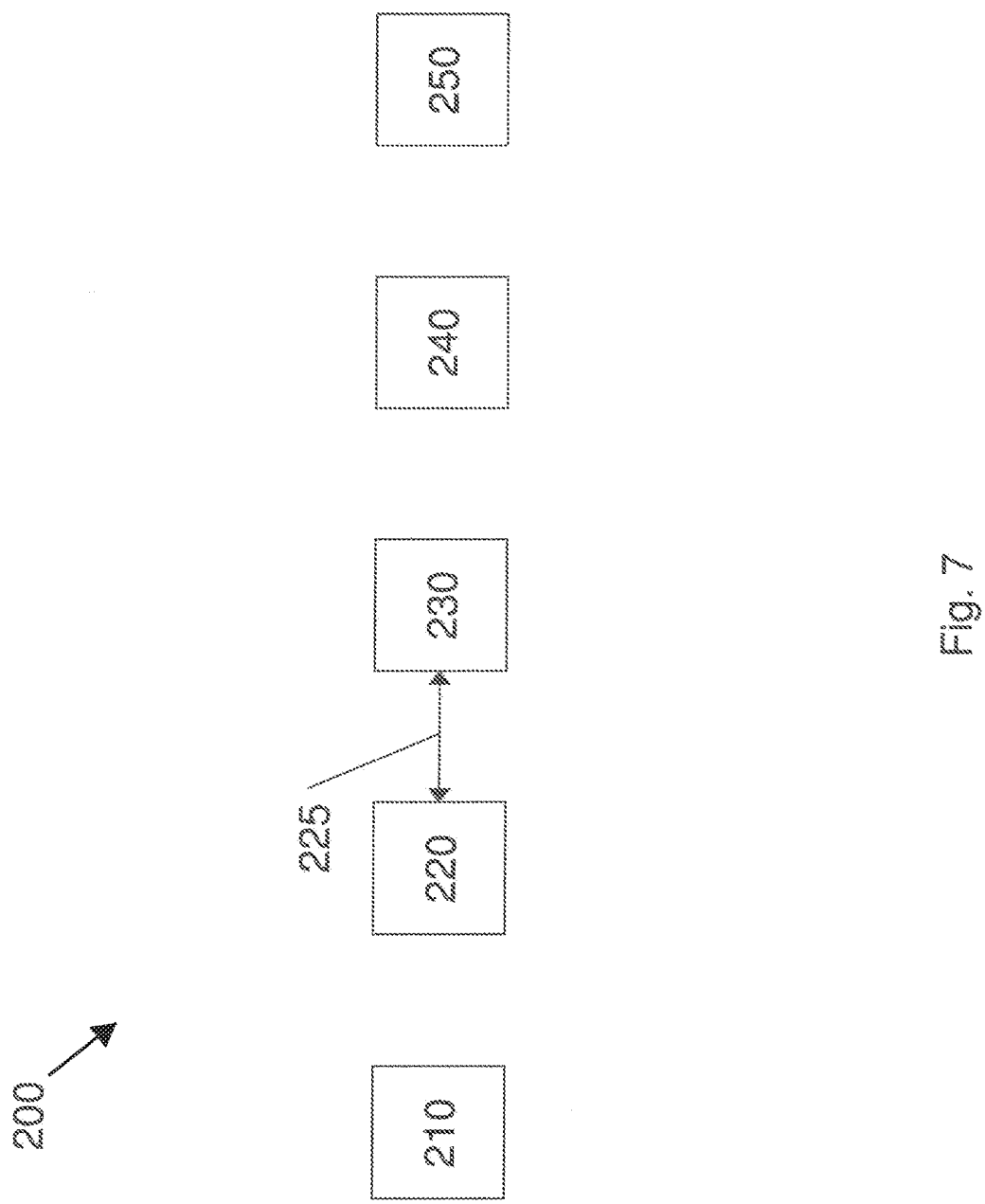
FIG. 7 shows a schematic representation of the second network at a second time.

The first connection 215, the third connection 235 and the fourth connection 245 are cleared down by the second network participant 220, the third network participant 230 and the fourth network participant 240 of the second network 200 essentially in parallel with one another. FIG. 7 shows a schematic representation of the second network 200 after the cleardown of the first connection 215, the third connection 235 and the fourth connection 245.

Figure 8:
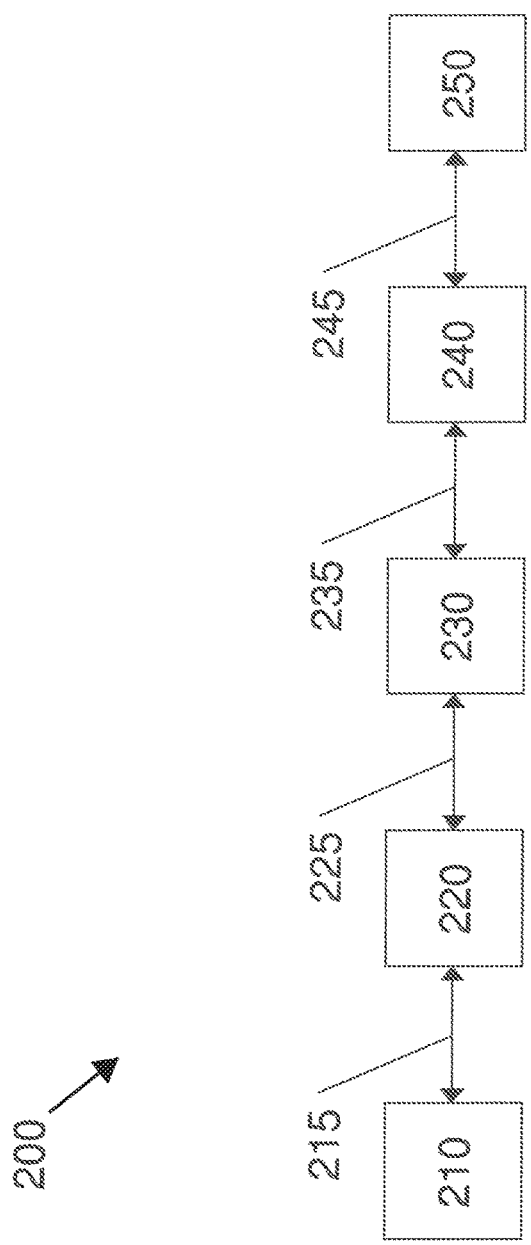
FIG. 8 shows a schematic representation of the second network at a third time.

The re-establishments of the first connection 215, the third connection 235 and the fourth connection 245 by the second network participant 220, the third network participant 230 and the fourth network participant 240 of the second network 200 are also carried out essentially in parallel with one another. FIG. 8 shows a schematic representation of the second network 200 following the re-establishment of the first connection 215, the third connection 235 and the fourth connection 245. The first connection 215, the third connection 235 and the fourth connection 245 are set to a transmission rate of 100 Mbit/s, as a result of which the value set for this parameter corresponds to the value set for this parameter in the second connection 225 of the second network 200.

Figure 9:
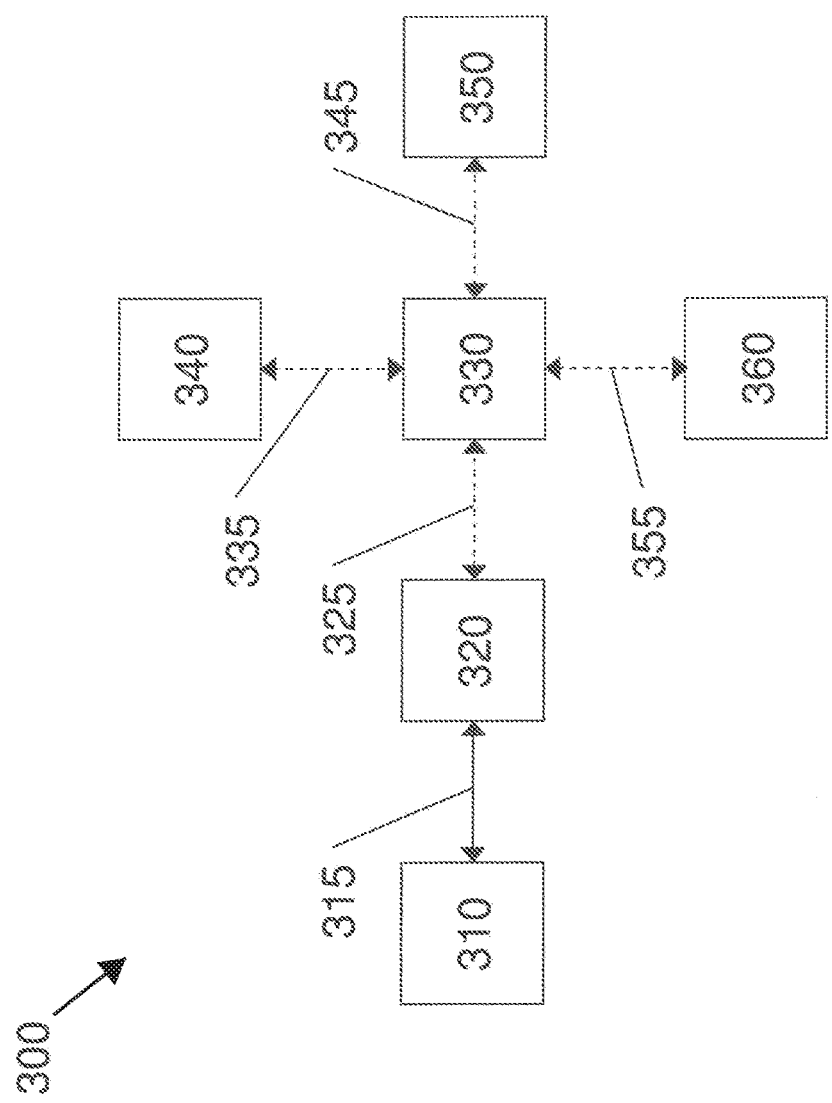
FIG. 9 shows a schematic representation of a third network at a first time.

FIG. 9 shows a schematic representation of a third network 300. As with the first network 100 and the second network 200, the third network 300 may, for example, be a network according to the Ethernet standard, in particular a network according to the EtherCAT standard.

However, unlike the first network 100 and the second network 200, the third network 300 partially has a tree topology. The third network 300 comprises a first network participant 310, a second network participant 320, a third network participant 330, a fourth network participant 340, a fifth network participant 350 and a sixth network participant 360. The first network participant 310 is connected via a first connection 315 to the second network participant 320. The second network participant 320 is connected via a second connection 325 to the third network participant 330. The third network participant 330 is connected via a third connection 335 to the fourth network participant 340. The third network participant 330 is furthermore connected via a fourth connection 345 to the fifth network participant 350. The third network participant 330 is furthermore connected via a fifth connection 355 to the sixth network participant 360. The third network participant 330 thus has a total of four connections 325, 335, 345, 355.

Again, for each of the connections 315, 325, 335, 345, 355, a plurality of different values can be set in each case for one or more parameters. In the example shown, it is again assumed that the parameter is a transmission rate of the respective connection 315, 325, 335, 345, 355, and this can assume the values 100 Mbit/s and 1 Gbit/s.

In the example shown, the first network participant 310 supports only a transmission rate of 100 Mbit/s, whereas the second network participant 320, the third network participant 330, the fourth network participant 340, the fifth network participant 350 and the sixth network participant 360 in each case support transmission rates of 100 Mbit/s and 1 Gbit/s. In establishing the connections 315, 325, 335, 345, 355 of the third network 300, the second connection 325, the third connection 335, the fourth connection 345 and the fifth connection 355 were set up with a transmission rate of 1 Gbit/s, whereas the first connection 315 was set up with a transmission rate of 100 Mbit/s.

For fault-free operation of the third network 300, it is necessary to align the transmission rates of all connections 315, 325, 335, 345, 355 with one another by setting the second connection 325, the third connection 335, the fourth connection 345 and the fifth connection 355 to a transmission rate of 100 Mbit/s. A method comprising the method parts 10, 20 shown schematically in FIGS. 2 and 3 is used for this purpose.

The second network participant 320 of the third network 300 carries out the first method part 10. In the first method step 11 of the first method part 10, the second network participant 320 recognizes that the transmission rate is set to the value of 100 Mbit/s in the first connection 315, whereas it is set to the value of 1 Gbit/s in the second connection 325. In the second method step 12 of the first method part 10, the second network participant 320 of the third network 300 transmits, via the second connection 325, a data message containing the information that the transmission rate must be set to the value 100 Mbit/s in connections. In the third method step 13 of the first method part 10, the second network participant 320 clears down the second connection 325 in order to then re-establish the second connection 325 in the fourth method step 14 of the first method part 10, wherein the transmission rate is set to 100 Mbit/s.

The third network participant 330 of the third network 300 carries out the second method part 20. In the first method step 21 of the second method part 20, the third network participant 330 receives the data message transmitted by the second network participant 320 via the second connection 325. In the second method step 22 of the second method part 20, the third network participant 330 of the third network 300 checks whether it has further connections in which the transmission rate is not set to 100 Mbit/s. This applies in the case of the third connection 335, the fourth connection 345 and the fifth connection 355. In the third method step 23 of the second method part 20, the third network participant 330 therefore forwards the previously received data message via the third connection 335, the fourth connection 345 and the fifth connection 355.

In the fourth method step 24 of the second method part 20, the third network participant 330 clears down the third connection 335, the fourth connection 345 and the fifth connection 355 in order to then re-establish the third connection 335, the fourth connection 345 and the fifth connection 355 in the fifth method step 25 of the second method part 20. The third network participant 330 then causes the third connection 335, the fourth connection 345 and the fifth connection 355 to be set to a transmission rate of 100 Mbit/s.

The fourth network participant 340, the fifth network participant 350 and the sixth network participant 360 of the third network 300 in each case carry out the second method part 20. In the first method step 21 of the second method part 20, the fourth network participant 340, the fifth network participant 350 and the sixth network participant 360 receive, via the third connection 335, the fourth connection 345 and the fifth connection 355, the data message transmitted by the third network participant 330. In the second method step 22 of the second method part 20, the fourth network participant 340, the fifth network participant 350 and the sixth network participant 360 of the third network check whether they have further connections in which the transmission rate is not set to 100 Mbit/s. Since this is not the case, the fourth network participant 340, the fifth network participant 350 and the sixth network participant 360 of the third network 300 then end the performance of the second method part 20.

Figure 10:
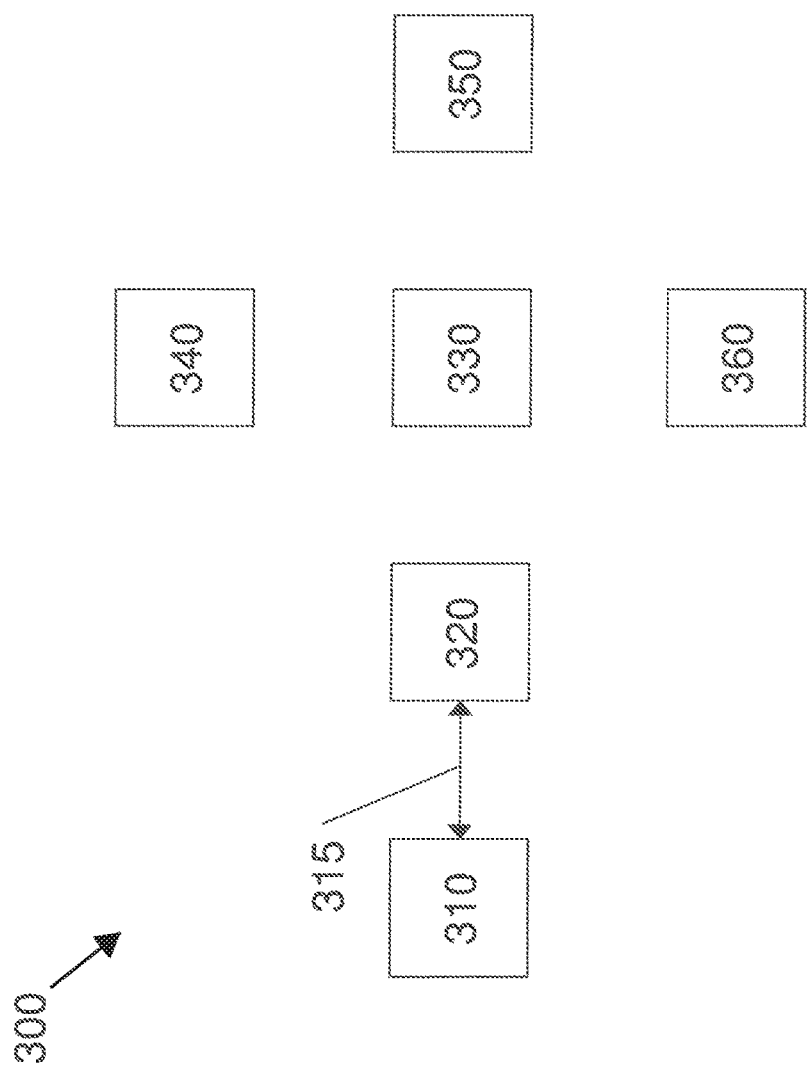
FIG. 10 shows a schematic representation of the third network at a second time.

The cleardown of the second connection 325 by the second network participant 320 of the third network 300 and the cleardown of the third connection 335, the fourth connection 345 and the fifth connection 355 by the third network participant 330 of the third network 300 are carried out essentially in parallel with one another. FIG. 10 shows a schematic representation of the third network 300 after the cleardown of the second connection 325, the third connection 335, the fourth connection 345 and the fifth connection 355.

Figure 11:
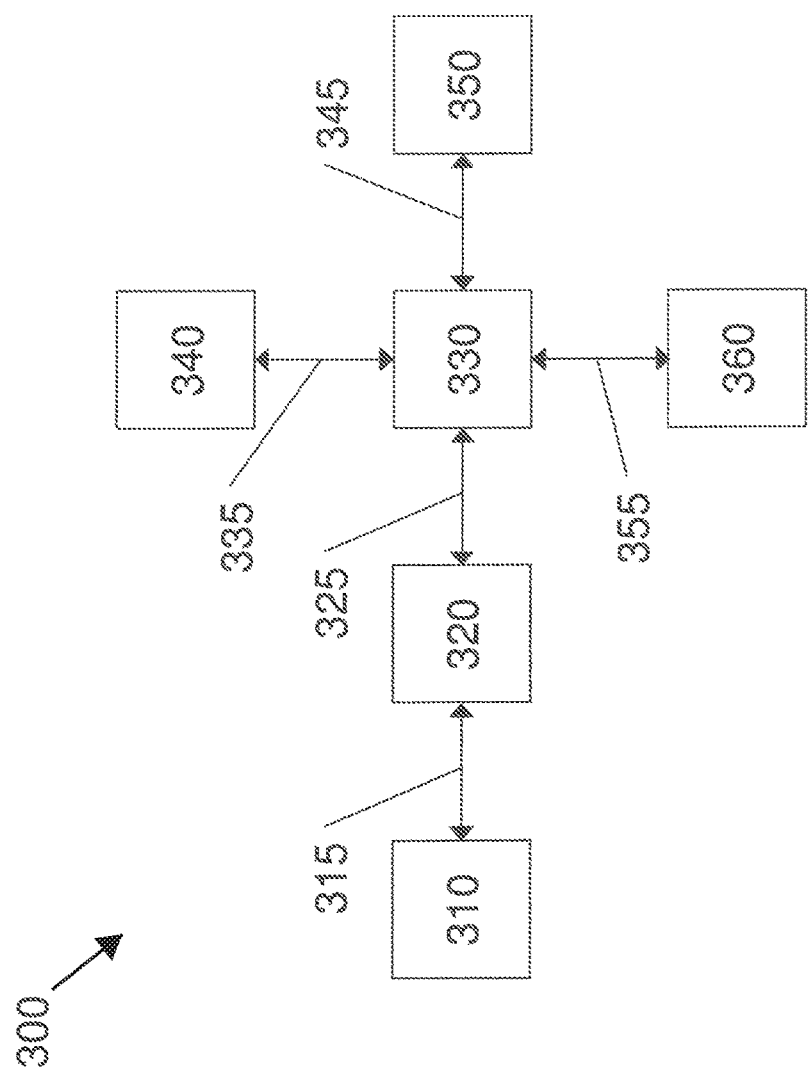
FIG. 11 shows a schematic representation of the third network at a third time.

The re-establishment of the second connection 325 by the second network participant 320 and the re-establishment of the third connection 335, the fourth connection 345 and the fifth connection 355 by the third network participant 330 are carried out essentially in parallel with one another. FIG. 11 shows a schematic representation of the third network 300 after the re-establishment of the second connection 325, the third connection 335, the fourth connection 345 and the fifth connection 355. In the state of the third network 300 shown in FIG. 11, a transmission rate of 100 Mbit/s is set for all connections 315, 325, 335, 345, 355 of the third network 300.

Figure 12:
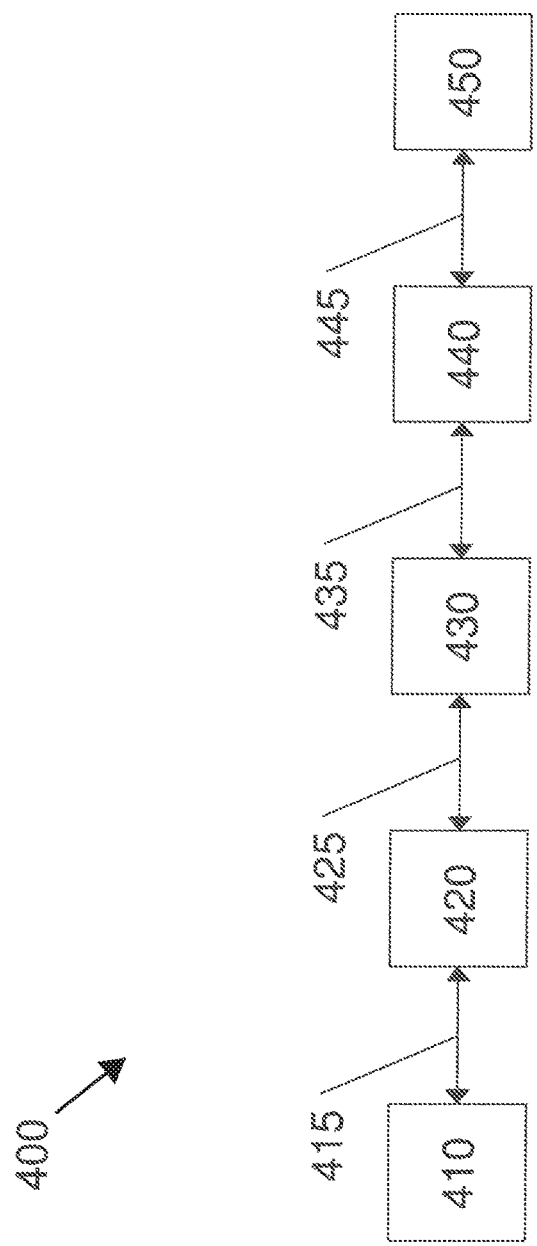
FIG. 12 shows a schematic representation of a fourth network at a first time.

FIG. 12 shows a schematic representation of a fourth network 400. The fourth network 400 may also, for example, be a network based on the Ethernet standard, in particular a network based on the EtherCAT standard.

The fourth network 400 comprises a first network participant 410, a second network participant 420, a third network participant 430, a fourth network participant 440 and a fifth network participant 450. A first connection 415 exists between the first network participant 410 and the second network participant 420. A second connection 425 exists between the second network participant 420 and the third network participant 430. A third connection 435 exists between the third network participant 430 and the fourth network participant 440. A fourth connection 445 exists between the fourth network participant 440 and the fifth network participant 450.

The first network participant 410 may be designed in the same way as the second network participant 420, the third network participant 430, the fourth network participant 440 and the fifth network participant 450 of the fourth network 400. However, the first network participant 410 may also be a special network participant of the fourth network 400, for example a master network participant.

In the fourth network 400 also, there are a plurality of parameters which can be set to different values for each of the connections 415, 425, 435, 445. However, in the example shown in FIG. 12, all such parameters are already set in each case to uniform values in all connections 415, 425, 435, 445 in the fourth network 400. For example, all connections 415, 425, 435, 445 can be set to a transmission rate of 100 Mbit/s in the fourth network 400.

In the fourth network 400, the value of a parameter is to be changed for all connections 415, 425, 435, 445. For example, the transmission rate of all connections 415, 425, 435, 445 is to be increased from 100 Mbit/s to 1 Gbit/s. This is carried out by means of a method which comprises the second method part 20 shown in FIG. 2 and a third method part 30 shown in FIG. 13 as a schematic flow diagram.

The first network participant 410 initiates the switchover here by carrying out the third method part 30. In a first method step 31 of the third method part 30, the first network participant 410 transmits a data message via the first connection 415, containing the information that a parameter must be set to a first value in connections between network participants of the fourth network 400. In the specific example, the data message therefore contains the information that the transmission rate must be set to the value 1 Gbit/s in connections.

Since the parameter does not have the first value in the first connection 415 of the first network participant 410 of the fourth network 400 either, i.e. the transmission rate is not set to 1 Gbit/s, the first network participant 410 then carries out a second method step 32 of the third method part 30 in which the first network participant 410 clears down the first connection 415. In a third method step 33 of the third method part 30, the first network participant 410 then re-establishes the first connection 415, wherein the parameter is set to the first value, i.e. a transmission rate of 1 Gbit/s is selected.

If a transmission rate of 1 Gbit/s had already been set for the first connection 415 at the start of the performance of the third method part 30, the second method step 32 and the third method step 33 of the third method part 30 could have been omitted.

The second network participant 420 carries out the second method part 20. In the first method step 21 of the second method part 20, the second network participant 420 receives the data message transmitted by the first network participant 410, containing the information that the transmission rate of 1 Gbit/s must be set in connections. In the second method step 22 of the second method part 20, the second network participant 420 checks whether it has further connections to further network participants of the fourth network 400 in which the transmission rate is not set to 1 Gbit/s. This applies to the second connection 425. In the third method step 23 of the second method part 20, the second network participant 420 therefore forwards, via the second connection 425, the data message received by the first network participant 410. In the fourth method step 24 of the second method part 20, the second network participant 420 clears down the second connection 425 and then re-establishes it in the fifth method step 25 of the second method part 20, wherein the transmission rate is set to the value 1 Gbit/s.

The third network participant 430 and the fourth network participant 440 of the fourth network 400 carry out the second method part 20 in a similar manner.

The fifth network participant 450 of the fourth network 400 also carries out the second method part 20, but establishes in the second method step 22 that it does not have further connections in which the transmission rate is not set to 1 Gbit/s. The fifth network participant 450 therefore ends the performance of the second method part 20 after the second method step 22.

Figure 14:
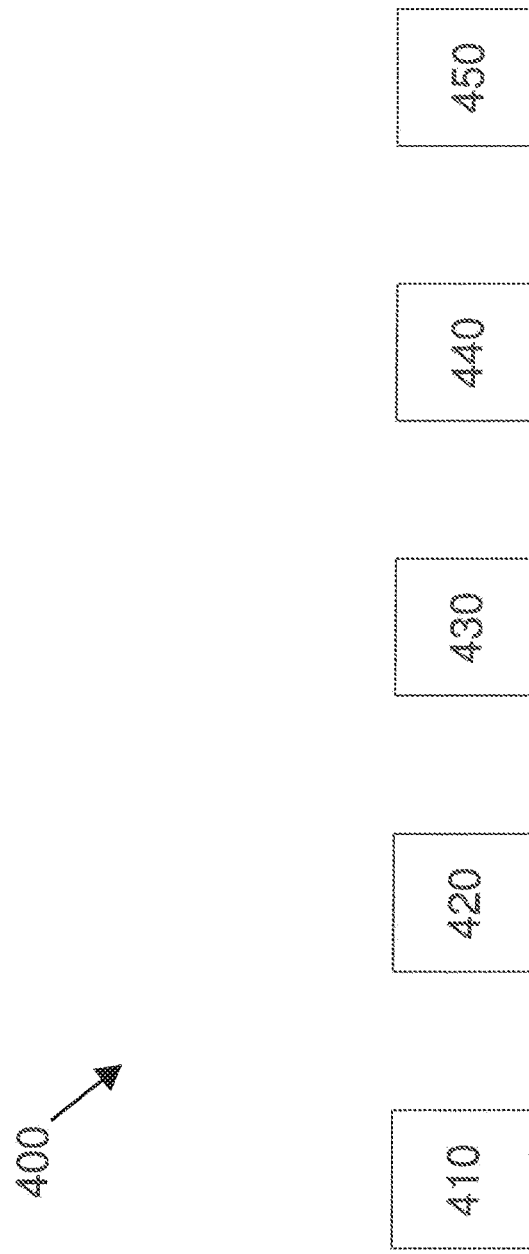
FIG. 14 shows a schematic representation of the fourth network at a second time.

The cleardown of the first connection 415 by the first network participant 410, the cleardown of the second connection 425 by the second network participant 420, the cleardown of the third connection 435 by the third network participant 430 and the cleardown of the fourth connection 445 by the fourth network participant 440 are carried out essentially in parallel with one another. FIG. 14 shows a schematic representation of the fourth network 400 after the cleardown of the first connection 415, the second connection 425, the third connection 435 and the fourth connection 445.

Figure 15:
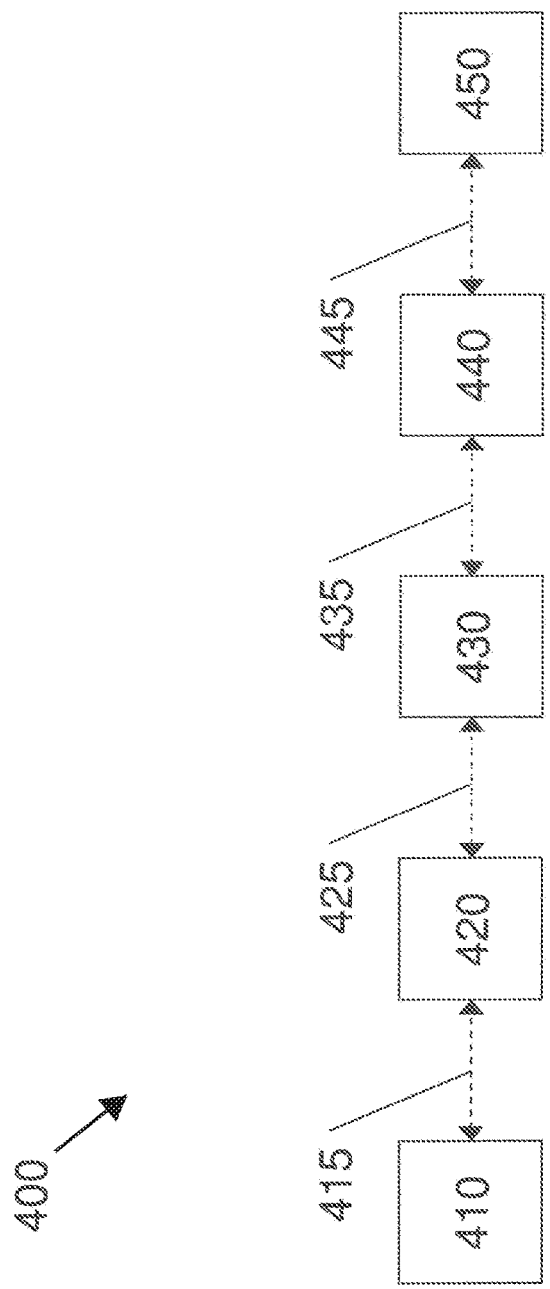
FIG. 15 shows a schematic representation of the fourth network at a third time.

The re-establishment of the first connection 415 by the first network participant 410, the second connection 425 by the second network participant 420, the third connection 435 by the third network participant 430 and the fourth connection 445 by the fourth network participant 440 are carried out essentially in parallel with one another. FIG. 15 shows a schematic representation of the fourth network 400 after the re-establishment of the first connection 415, the second connection 425, the third connection 435 and the fourth connection 445. All connections 415, 425, 435, 445 are then set to a transmission rate of 1 Gbit/s.

In the examples explained with reference to FIGS. 1 to 11, the switchover of the value of a parameter of the connections in the networks was triggered by the recognition that the parameter has different values in different connections (first method step 11 of the first method part). Conversely, the switchover in the example explained with reference to FIGS. 12 to 15 is triggered by a network participant without different values of the parameter having to be present (first method step 31 of the third method part). According to the invention, in all examples, the information relating to the necessary switchover of the value of the parameter was first forwarded in the network before the switchover was carried out.

In a method for operating a network in which a first network participant is connected via a first connection to a further network participant, the first network participant may carry out steps of receiving a data message containing the information that a parameter must be set to a first value in connections, via the first connection, and of checking whether the first network participant is connected via a second connection to a still further network participant of the network and the parameter is not set to the first value in the second connection. In this case, the first network participant may furthermore carry out steps of forwarding the data message via the second connection, of clearing down the second connection and of re-establishing the second connection, wherein the parameter for the second connection is set to the first value.

This method advantageously enables the value of the parameter to be adjusted to a required value in a plurality or all connections of the network. A fault-free operation of the network can advantageously be guaranteed as a result. One particular advantage of the method consists in that the data message containing the information that the parameter must be set to a first value in connections is forwarded before the second connection is cleared down and re-established. As a result, the data message can reach further network participants of the network even before the second connection is cleared down, said network participants being connected via connections to other network participants in which the parameter is not set to the first value. It is thereby enabled that a plurality of network participants of the network carry out steps of clearing down and re-establishing connections simultaneously and in parallel with one another. The overall time required until the value of the parameter in the connection of the network is adjusted is hereby advantageously reduced.

The first network participant may transmit the data message via all its connections except the first connection, the parameter not being set to the first value in said connections. As a result, the method advantageously enables the data message to be forwarded at branch points of the network into all branches of the network simultaneously. As a result, connections can advantageously be cleared down and re-established as required in all parts of the network in parallel, whereby the overall time requirement can be drastically reduced.

A second network participant of the network may be connected via a third connection and a fourth connection to further network participants of the network. The second network participant may carry out steps of recognizing that the parameter is set to the first value in the third connection and the parameter is set to a second value in the fourth parameter, of transmitting the data message containing the information that the parameter must be set to the first value in connections, of clearing down the fourth connection and of re-establishing the fourth connection, wherein the parameter for the fourth connection is set to the first value.

This method advantageously enables the value of the parameter to be adjusted to a common value in a plurality or all connections of the network. A fault-free operation of the network can advantageously be guaranteed as a result. One particular advantage of the method consists in that the data message containing the information that the parameter must be set to a first value in connections is forwarded before the fourth connection is cleared down and re-established. It is thereby enabled that a plurality of network participants of the network carry out steps of clearing down and re-establishing connections simultaneously and in parallel with one another. The overall time required until the value of the parameter in the connection of the network is adjusted is hereby advantageously reduced.

The second network participant may transmit the data message via the fourth connection. As a result, further network participants of the network connected to the second network participant of the network via the fourth connection advantageously receive a message that the parameter is to be set to the first value in connections.

The second network participant may transmit the data message via all its connections in which the parameter is not set to the first value. It is thereby advantageously achieved that the data message is forwarded at a branch point of the network into all branches of the network simultaneously. As a result, the parameter can advantageously be set to the first value in all branches of the network in parallel, as a result of which the total time required for this purpose can be reduced.

The second network participant may chose to not transmit the data message via the third connection. This is not required since the parameter is already set to the first value in the third connection. Unnecessary data traffic is hereby advantageously avoided. Furthermore, unnecessary connection cleardowns and re-establishments are advantageously avoided.

A second network participant of the network may be connected via a third connection to a further network participant of the network. The second network participant may carry out a step of transmitting the data message containing the information that the parameter must be set to the first value in connections, via the third connection. As a result, the method advantageously enables a setting, requested by a network participant of a network, of a parameter of connections to a specific value. The requesting network participant may, for example, be a master of the network. The method thereby enables, for example, a controlled change of a transmission rate or of a different parameter of the network.

The second network participant may carry out further steps of clearing down the third connection and re-establishing the third connection, wherein the parameter for the third connection is set to the first value. It is thereby advantageously ensured that the change of the parameter also takes effect for the third connection connected to the second network participant.

The parameter may be a transmission rate. The method can thereby advantageously ensure that all connections of the network are operated at the same transmission rate. Data bottlenecks, buffer overflows and buffer underruns are thereby advantageously avoided.

The first value may be a transmission rate of 100 Mbit/s. The method can thereby advantageously ensure that all connections of the network are operated at a transmission rate which is supported by all network participants of the network.

The second value may be a transmission rate of 1 Gbit/s. The method thereby advantageously enables the network to be operated with network participants which support a transmission rate of 1 Gbit/s and a lower transmission rate, and also with network participants which only support the lower transmission rate. It is advantageously ensured by the method that all connections of the network are set in this case to the lower transmission rate.

The parameter may be a message format, a minimum message length, a maximum message length, a minimum time interval between two transmitted data frames, a line code or an addressing mode. In this design, the method advantageously enables an adjustment of one of these parameters in all connections of the network. A fault-free operation of the network is thereby advantageously enabled.

The data message may be an Ethernet message. The method is thereby advantageously usable in a large number of already existing networks.

The data message may be an EtherCAT message, i.e. an Ethernet message of a special type. The method is thereby advantageously usable in a network for automation. One particular advantage of the method consists in that it enables a combined operation of the network with network participants which support a transmission rate of 100 Mbit/s and 1 Gbit/s, with other network participants which allow a transmission rate of 100 Mbit/s only.

A network participant may be designed to carry out a method of the aforementioned type. This network participant can advantageously be used in a network in which network participants which allow different values for a parameter of a connection are combined with network participants which allow only one value for the parameter of the connection. The network participant enables the parameter to be set automatically within the network to a value which is supported by all network participants of the network. The parameter may, in particular, be a transmission rate.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

The invention claimed is:

1. A method for operating a network,
wherein a first network participant of the network is connected via a first connection to a further network participant of the network, and
wherein the first network participant carries out the following steps:
receiving a data message containing the information that a parameter must be set to a first value in connections, via the first connection, and
checking whether the first network participant is connected via a second connection to a still further network participant of the network and checking whether the parameter is not set to the first value in the second connection;
wherein the first network participant in this case carries out the following further steps:
forwarding the data message via the second connection,
clearing down the second connection,
re-establishing the second connection, wherein the parameter for the second connection is set to the first value; and
wherein the first network participant transmits the data message via all its connections in which the parameter is not set to the first value, except via the first connection.

2. The method as claimed in claim 1,
wherein a second network participant of the network is connected via a third connection and a fourth connection to further network participants of the network, and
wherein the second network participant carries out the following steps:
recognizing that the parameter is set to the first value in the third connection and the parameter is set to a second value in the fourth connection,
transmitting the data message containing the information that the parameter must be set to the first value in connections,
clearing down the fourth connection, and
re-establishing the fourth connection, wherein the parameter for the fourth connection is set to the first value.

3. The method as claimed in claim 2, wherein the second network participant transmits the data message via the fourth connection.

4. The method as claimed in claim 3, wherein the second network participant transmits the data message via all its connections in which the parameter is not set to the first value.

5. The method as claimed in claim 2, wherein the second network participant does not transmit the data message via the third connection.

6. The method as claimed in claim 1,
wherein a second network participant of the network is connected via a third connection to a further network participant of the network, and
wherein the second network participant carries out the following step:
transmitting the data message containing the information that the parameter must be set to the first value in connections, via the third connection.

7. The method as claimed in claim 6, wherein the second network participant carries out the following further steps:
clearing down the third connection; and
re-establishing the third connection, wherein the parameter for the third connection is set to the first value.

8. The method as claimed in claim 1, wherein the parameter is a transmission rate.

9. The method as claimed in claim 8, wherein the first value is a transmission rate of 100 Mbit/s.

10. The method as claimed in claims 2 and 8, wherein the second value is a transmission rate of 1 Gbit/s.

11. The method as claimed in claim 1, wherein the parameter is a message format, a minimum message length, a maximum message length, a minimum time interval between two transmitted data frames, a line code or an addressing mode.

12. The method as claimed in claim 1, wherein the data message is an Ethernet message.

13. The method as claimed in claim 12, wherein the data message is an EtherCAT message.

14. A network participant, wherein the network participant is designed to carry out a method as claimed in claim 1.

* * * * *